United States Patent
Hong et al.

(10) Patent No.: US 8,228,033 B2
(45) Date of Patent: Jul. 24, 2012

(54) PROTECTIVE CIRCUIT BOARD HAVING GROOVE AND BATTERY PACK USING THE SAME

(75) Inventors: Ki-Sung Hong, Suwon-si (KR); In-Kyu Park, Suwon-si (KR); Bo-Hyun Byun, Suwon-si (KR)

(73) Assignee: Samsung SDI Co., Ltd., Gongse-dong, Giheung-gu, Yongin-si, Gyeonggi-do (KR)

( * ) Notice: Subject to any disclaimer, the term of this patent is extended or adjusted under 35 U.S.C. 154(b) by 537 days.

(21) Appl. No.: 12/222,515

(22) Filed: Aug. 11, 2008

(65) Prior Publication Data

US 2009/0085518 A1      Apr. 2, 2009

(30) Foreign Application Priority Data

Sep. 27, 2007  (KR) .................. 10-2007-0097341

(51) Int. Cl.
*H02J 7/00*     (2006.01)
(52) U.S. Cl. ...................................... 320/128; 320/107
(58) Field of Classification Search .................. 320/128
See application file for complete search history.

(56) References Cited

U.S. PATENT DOCUMENTS

| | | | | |
|---|---|---|---|---|
| 4,663,208 A * | 5/1987 | Ninomiya et al. | ............ | 428/138 |
| 2002/0032961 A1 * | 3/2002 | Matsuda | .......................... | 29/847 |
| 2005/0153172 A1 * | 7/2005 | Han | ................................. | 429/7 |
| 2005/0153195 A1 * | 7/2005 | Han | ................................ | 429/59 |
| 2005/0214597 A1 * | 9/2005 | Kim et al. | ......................... | 429/7 |
| 2005/0272479 A1 | 12/2005 | Infanti | | |
| 2006/0079081 A1 * | 4/2006 | Hsu et al. | ...................... | 438/618 |
| 2008/0094032 A1 * | 4/2008 | Miyamoto et al. | ............ | 320/134 |

FOREIGN PATENT DOCUMENTS

| | | |
|---|---|---|
| CN | 1465109 | 12/2003 |
| CN | 1649199 | 8/2005 |
| EP | 1804314 | 7/2007 |
| JP | 3555850 | 5/2004 |
| JP | 2005-190814 | 7/2005 |
| KR | 20020077175 | 10/2002 |
| KR | 20050077480 | 8/2005 |
| KR | 20050082424 | 8/2005 |
| KR | 10-0530156 | 11/2005 |
| KR | 20060027272 | 3/2006 |
| KR | 20070088894 | 8/2007 |
| WO | 2007/073066 A1 | 6/2007 |

OTHER PUBLICATIONS

Chinese Office Action issued on Sep. 18, 2009 in the corresponding Chinese Patent Application No. 200810161267.3.

(Continued)

*Primary Examiner* — Arun Williams
(74) *Attorney, Agent, or Firm* — Robert E. Bushnell, Esq.

(57) ABSTRACT

A protective circuit board and a battery pack using the same, which includes a groove formed at one side and receives an external connection terminal in the groove, is provided. The protective circuit board for a battery, which is formed by mounting a number of electrical devices on a board on which a wiring pattern is formed and which is connected to a bare cell so as to protect a battery, comprises a groove formed on a surface of the protective circuit board, and an external connection terminal formed inside the groove.

15 Claims, 6 Drawing Sheets

OTHER PUBLICATIONS

European Search Report from the European Patent Office issue in Applicant's corresponding European Patent Application No. 08165290.1-1227 dated Jan. 29, 2009.

European Office Action issued on Nov. 25, 2009 in the corresponding European Patent Application No. 08 165 290.1.

Korean Notice of Allowability issued on Aug. 29, 2008 in corresponding Korean Patent Application No. 2007-0097341.

* cited by examiner

PROTECTIVE CIRCUIT BOARD HAVING GROOVE AND BATTERY PACK USING THE SAME

CLAIM OF PRIORITY

This application makes reference to, incorporates the same herein, and claims all benefits accruing under 35 U.S.C. §119 from an application for PROTECTIVE CIRCUIT BOARD AND BATTERYPACK USING THE SAME earlier filed in the Korean Intellectual Property Office on the 27 of Sep. 2007 and there duly assigned Serial No. 10-2007-0097341.

BACKGROUND OF THE INVENTION

1. Field of the Invention

The present invention relates to a protective circuit board and a battery pack using the same, and more particularly, to a protective circuit board and a battery pack using the same that includes a groove formed at one side for receiving an external connection terminal, so that an increase in thickness is prevented upon wire soldering.

2. Discussion of the Related Art

Mobile communication terminals, such as a notebook, a mobile phone, a PDA and the like, which are portable and provide various functions in addition to a communication function have been recognized as the modern necessities.

Mobile communication terminals provide the various functions, such as a communication function, a message sending/receiving function, a wireless internet function, an electronic diary function, a photographing/reproduction function and others and generally use batteries as a power source for driving.

In view of power supplying time, size and weight, a battery is recognized as being important in determining the portability and mobility of a mobile communication terminal. A battery has been developed to increase the power supplying time and to be small and light. Specifically, it is general that a battery is provided with a battery protective circuit to extend battery life and to prevent accidents.

Secondary batteries include a nickel-cadmium battery, a nickel-zinc battery, and a lithium-ion battery. Generally, the lithium-ion batteries have been widely used.

A battery is electrically connected to a protective circuit, to form a battery pack. Battery packs are largely divided into an outer battery pack and an inner battery pack, depending on the shape thereof.

FIG. 1 is an exploded perspective view of an example of a conventional inner battery pack 10. The battery pack 10 is completed by fitting top and bottom insert molding units 16 and 17 into both ends of a battery cell 15 electrically connecting a bare cell 11 and a protective circuit board 12 by spot welding or soldering, and then by wrapping the bare cell 11 in a label 18 to be finished. Instead of the top insert molding unit 16, resin molding may be performed between the bare cell 11 and the protective circuit board 12.

When a lithium ion battery is over-charged at about 4.5 V or above, since water remaining in an electrolyte inside the battery is dissolved, a hydrogen gas is generated and the pressure inside the battery increases, to generate heat and start fire.

Further, when the lithium ion battery is over-discharged at about 2.7 V or below, since lithium is over-emitted, an active substance of an electrode melts by reacting with an electrolyte.

Therefore, the protective circuit board for the battery prevents the battery from being over-charged at about 4.35 V or above, converts the battery to a charge state when a voltage drops at about 4.0 V or below, and prevents the battery from being over-discharged at about 2.3 V or below.

Further, when the lithium ion battery has load or an over-current is generated due to an abnormality of a power set of a mobile communication terminal, the protective circuit board for the battery performs a function of shutting off power.

FIG. 2 is a plan view of an example of a protective circuit board 20 included in a battery pack. The protective circuit board 20 comprises a board 21, a control unit 22 mounted on the board 21, a switch unit 23, resistors 24 and 25, a capacitor 26, positive and negative battery connection terminals B+ and B−, and positive and negative power terminals P+ and P−.

The control unit 22 senses over-charge, over-discharge or over-current and turns on/off the switch unit 23 to apply/shut off the power of a circuit.

The resistors 24 and 25 and the capacitor 26 protects an IC chip used as the control unit 22 and the switch unit 23 from an abnormal voltage or static electricity and remove a noise generated in a power source unit of the IC chip.

The positive and negative battery connection terminals B+ and B− are electrically connected to the bare cell, and the positive and negative power terminals P+ and P− are connected to the mobile communication terminal and form an electrical path upon charging and discharging.

Then, when wire soldering is performed to the positive and negative power terminals P+ and P−, the positive and negative power terminals P+ and P− thicken by the thickness of the wire or soldering part. Moreover, since no part for supporting the wire is formed, the position of the wire is movable upon the soldering and therefore it is difficult to perform the work.

Moreover, when the terminals to be soldered are positioned closely to one another, there is a problem in that a risk of a short is high.

SUMMARY OF THE INVENTION

In an aspect of the present invention, the present invention provides a protective circuit board that includes a groove formed on a first surface of the protective circuit board, and an external connection terminal formed inside the groove.

In another aspect of the present invention, the present invention provides a battery pack which comprises an electrode assembly for generating electricity, a can receiving the electrode assembly and having an opening at one end, a cap assembly coupled to the electrode assembly, and a protective circuit unit positioned at one side of the cap assembly. The electrode assembly includes a positive electrode plate, a negative electrode plate and a separator. The cap assembly includes a cap plate covering the opening, and an electrode terminal coupled to the positive electrode plate or the negative electrode plate. The protective circuit unit includes a protective circuit board, and the protective circuit board further includes a groove formed on a first surface of the protective circuit board, and an external connection terminal formed inside the groove.

The protective circuit board may include at least two grooves and at least two external connection terminals, and the number of the grooves is the same as the number of the external connection terminals.

The groove may be formed to be equal to or deeper than the thickness generated by a wire or solder.

The protective circuit board may further include a positive terminal coupled to a positive electrode tab of the battery, and a negative terminal coupled to a negative electrode tab of the battery. Both of the positive terminal and the negative terminal formed on a second surface of the protective circuit board that is opposite to the first surface.

The cap assembly of the battery pack may further include an insulating case disposed between the cap plate and the electrode assembly, a terminal plate disposed between the cap plate and the insulating case where the terminal plate being coupled to the electrode terminal, an insulating plate disposed between the cap plate and the terminal plate where the insulating plate insulating the terminal plate from the cap plate, and an insulating gasket installed inside a hole formed on the cap plate. The electrode terminal engages into the insulating gasket.

In accordance with the present invention, the terminals are prevented from thickening due to the thickness generated by wire soldering. Furthermore, since a positional reference point is generated upon work, the movement between the terminal and the wire is prevented, to improve the easiness of work. Furthermore, since the soldering is performed inside the groove, a short between the terminals is prevented.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicated the same or similar components, wherein.

DETAILED DESCRIPTION OF THE INVENTION

Figure 1:
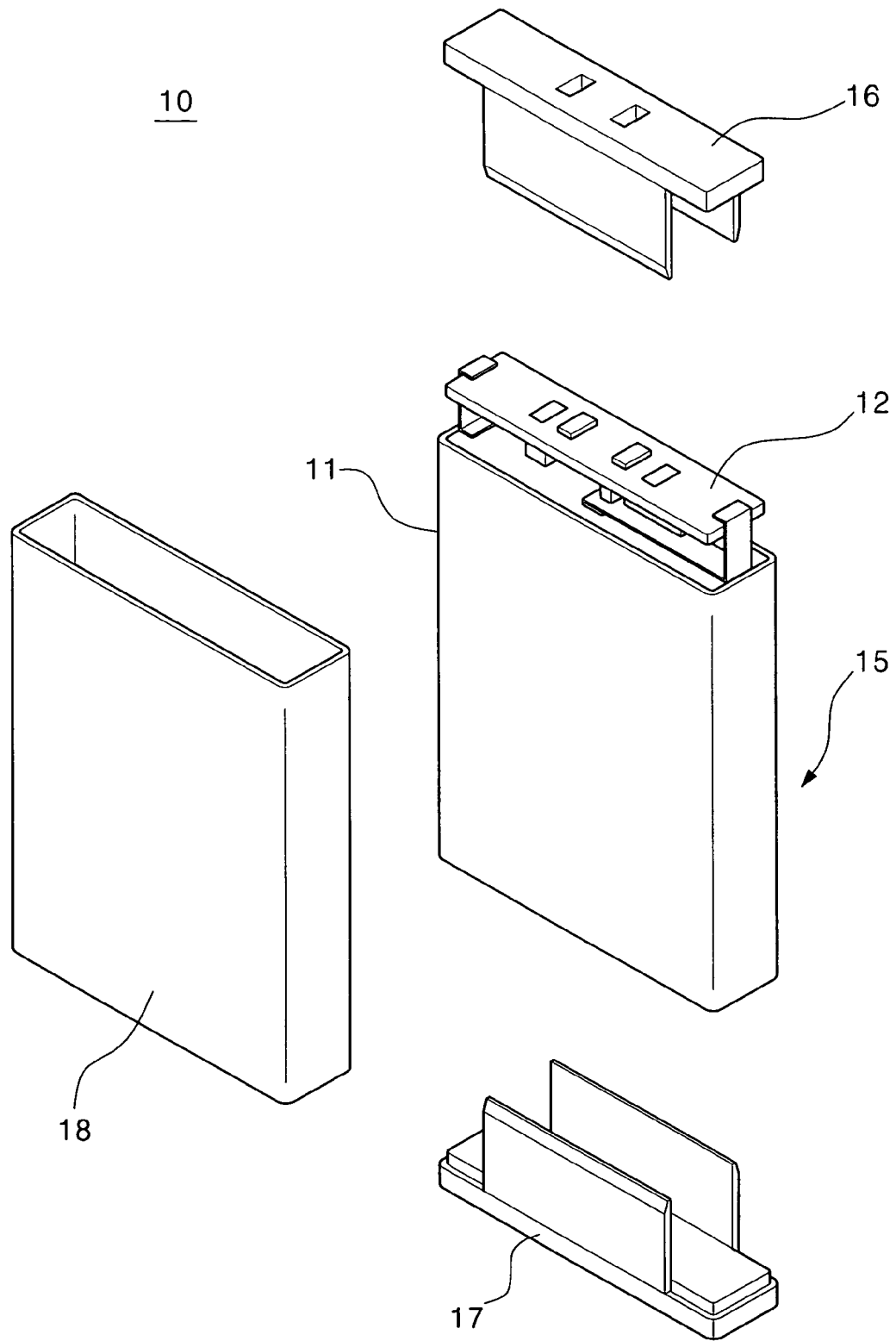
FIG. 1 is an exploded perspective view of an example of a inner battery pack.
Figure 2:
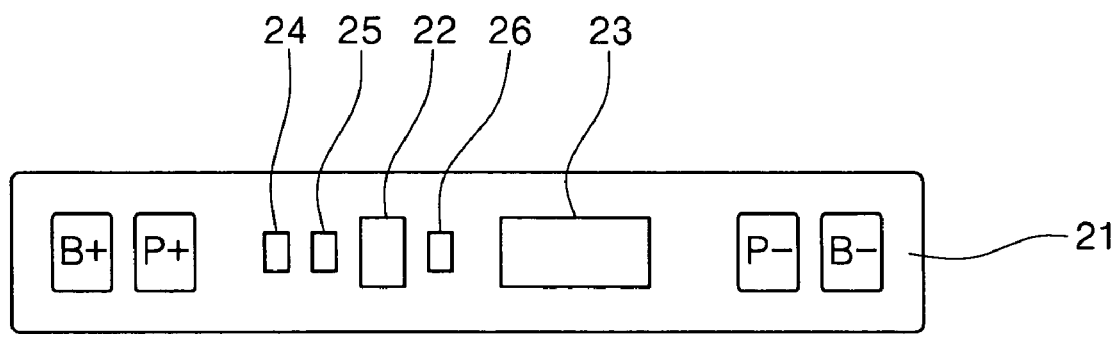
FIG. 2 is a plan view of an example of a protective circuit board included in the battery pack.

The present invention will now be described more fully hereinafter with reference to the accompanying drawings, in which preferred embodiments of the invention are shown. In the drawings, the thicknesses of layers and regions are exaggerated for clarity.

Figure 3:
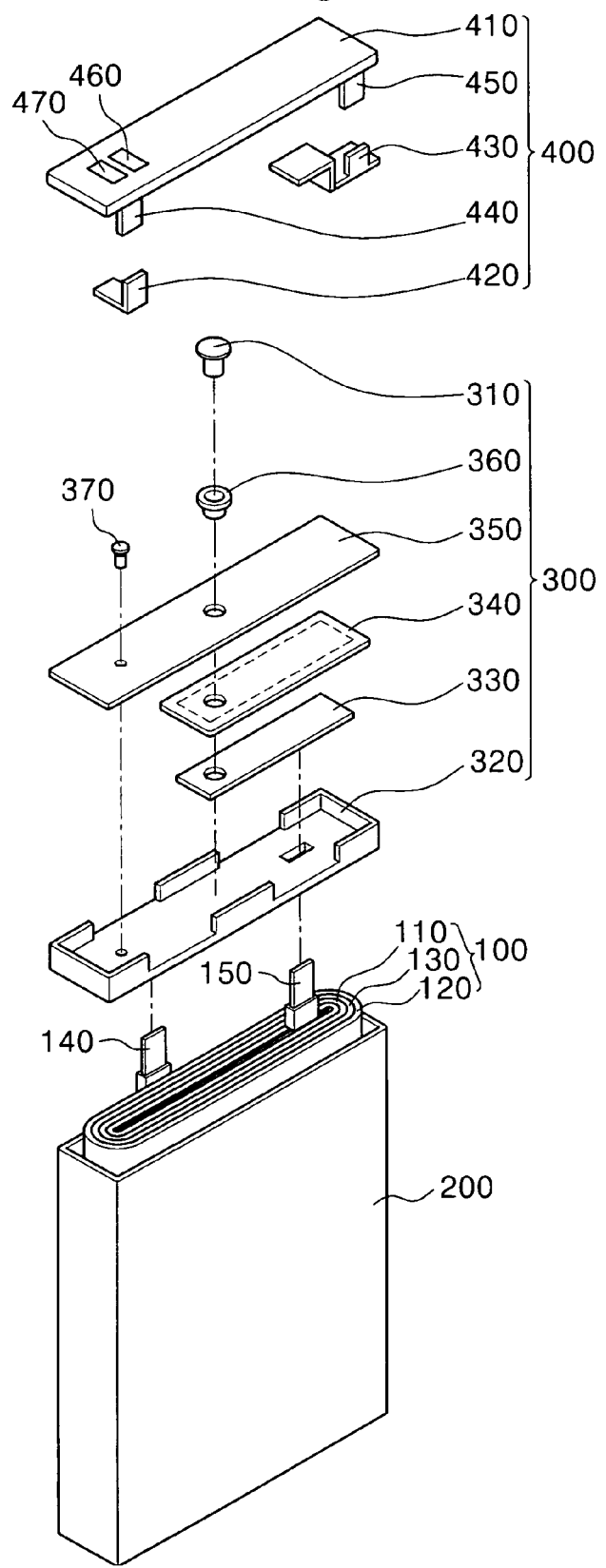
FIG. 3 is an exploded perspective view of the constitution of a battery pack according to an embodiment of the present invention.
Figure 4:
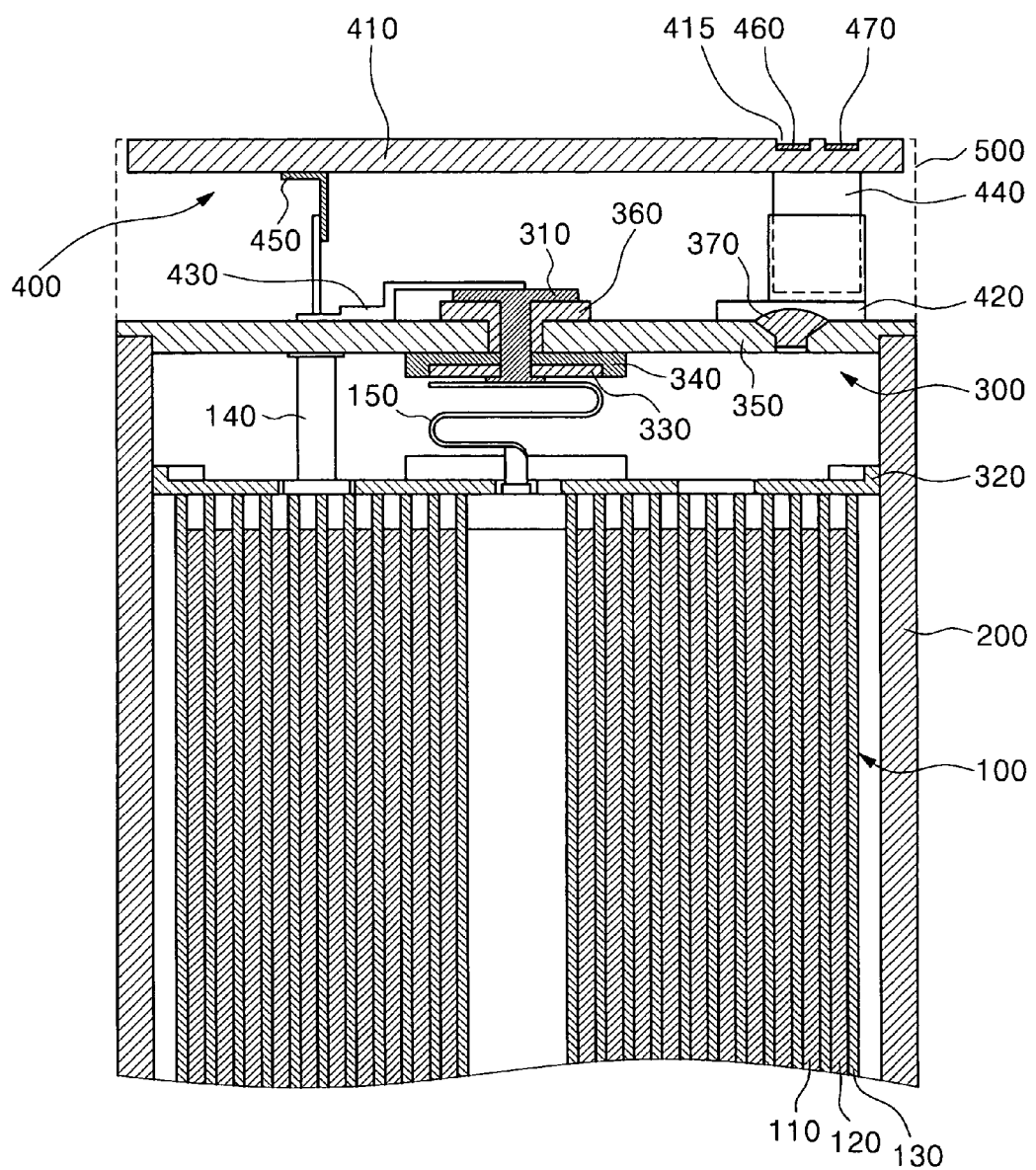
FIG. 4 is a sectional view of the battery pack of FIG. 3 being connected.

FIG. 3 is an exploded perspective view of the constitution of a battery pack according to an embodiment of the present invention, and FIG. 4 is a sectional view of the battery pack of FIG. 3 being connected.

Referring to FIGS. 3 and 4, the battery pack comprises an electrode assembly 100, a can 200, and a cap assembly 300. The electrode assembly 100 is formed by laminating a positive electrode plate including a positive electrode tab, a negative electrode plate including a negative electrode tab, and a separator. The laminated plates are wound to form the electrode assembly 100. The can 200 has an opening at one end, and receives the electrode assembly 100. The cap assembly 300 seals the opening of the can 200, and is electrically connected to the positive electrode tab and the negative electrode tab of the electrode assembly 100.

The battery pack may further comprise a protective circuit unit 400 and molding unit 500. The protective circuit unit 400 is electrically connected to the cap assembly 300, and includes a protective circuit board that includes an electronic circuit and an electrical terminal for a safety device. The molding unit 500 connects a portion of the cap assembly 300 to a portion of the protective circuit unit 400 by using molten resin.

The electrode assembly 100 comprises a positive electrode plate 110 formed by coating a positive electrode collector with a positive electrode active material, a negative electrode plate 120 formed by coating a negative electrode collector with a negative electrode active material, a separator 130 interposed between the positive electrode plate 110 and the negative electrode plate 120 and preventing a short between the positive electrode plate 110 and the negative electrode plate 120 and enabling movement of lithium ions, a positive electrode tab 140 joined to the positive electrode plate 110, and a negative electrode tab 150 joined to the negative electrode plate 120.

The positive electrode plate 110 is formed of the positive electrode collector and the positive electrode active material coating the positive electrode collector. The positive electrode active material may include a stratified compound containing lithium, a binder improving a binding force, and a conductive material improving conductivity.

The positive electrode collector generally uses aluminum. The positive electrode collector is a path through which an electric charge generated from the positive electrode active material moves and supports the positive electrode active material. The positive electrode active material is formed on the whole surface of the positive electrode collector, except for one side end thereof (hereinafter, referred to as the 'positive electrode non-coating portion'). The positive electrode tab 140 is joined to the positive electrode non-coating portion.

The negative electrode plate 120 is formed of the negative electrode collector and the negative electrode active material coating the negative electrode collector. The negative electrode active material uses hard carbon or black lead containing carbon and it may include a binder improving the binding force between the negative electrode active materials.

The negative electrode collector generally uses copper. The negative electrode collector is a path through which an electric charge generated from the negative electrode active material moves and supports the negative electrode active material. The negative electrode active material is formed on the whole surface of the negative electrode plate 120, except for one side end of the negative electrode plate 120 (hereinafter, referred to as the 'negative electrode non-coating portion'). The negative electrode tab 150 is joined to the negative electrode non-coating portion.

The separator 130 interposed between the positive electrode plate 110 and the negative electrode plate 120 insulates the positive electrode plate 110 and the negative electrode plate 120 form each other and enables the movement of lithium ions.

In general, the separator 130 may be formed of a polymer layer based on polyolefin, such as polyethylene (PE) and polypropylene (PP), or a multi-layer thereof. However, the present invention does not limit the material of the separator. Further, the separator may include an electrolyte or it may be formed in a liquid or gel state.

The can 200 is in the shape in which a top end is opened, and it may be formed of a metal material. The can 200 receives the electrode assembly 100 and the electrolyte. An insulating case is held in the inside of the opening unit. Preferably, the metal material may use light and flexible aluminum, aluminum alloy, or stainless steel, so that the can 200 is capable of functioning as a terminal.

The can 200 may be in a prismatic shape or an oval shape in which the corners are curved. The opening unit of the can 200 is welded or thermally bonded to a cap plate, to be sealed. Then, the insulating case is held inside the can 200 and protrudes the positive electrode tab 140 and the negative electrode tab 150 outward to be insulated from each other.

The cap assembly 300 comprises an electrode terminal 310 electrically connecting the negative electrode tab 150 of the electrode assembly 100 to a negative electrode lead plate 430, an insulating case 320 held inside the opening unit of the can 200 receiving the electrode assembly 100, and a terminal plate 330 held at one side of the insulating case 320 and formed of a conductive material to form an electrical path.

The cap assembly 300 further comprises an insulating plate 340 insulating the external surface of the terminal plate 330 and including a hole for connecting the electrode terminal 310 and the terminal plate 330, and a cap plate 350 including an electrolyte injection hole and an electrode terminal hole and covering the opening unit of the can 200, an insulating gasket 360 covering a body of the electrode terminal 310 and connected to the electrode terminal hole of the cap plate 350, and an electrolyte injection hole stopper 370 sealing the electrolyte injection hole of the cap plate 350.

The electrode terminal 310 is formed of a body and a top having a broader area to some extent. The body of the electrode terminal 310 is connected to the terminal plate 330 through the holes formed on the insulating gasket 360, the cap plate 350 and the insulating plate 340. The top protruding outward is connected to the negative electrode lead plate 430, to form an electrical path from the negative electrode tab 150 of the electrode assembly 100 to the protective circuit unit.

The insulating case 320 is held inside the opening unit of the can 200 and covers the top surface of the electrode assembly 100 of the can 200. The insulating case 320 includes an edge forming a wall, to hold the insulating plate 340 covering the terminal plate 330 and the insulating plate 340 covering the terminal plate 330. The insulating case 320 spaces the positive electrode tab from the negative electrode tab to prevent a short and includes openings for protruding the positive electrode tab and the negative electrode tab.

The terminal plate 330 is connected to the electrode terminal 310 through the hole and simultaneously is connected to the negative electrode tab 150 on the lower surface thereof. The insulating plate 340 is formed to cover the terminal plate 330 and includes an electrode terminal hole into which the electrode terminal 310 with the insulating gasket 360 is inserted.

The cap plate 350 is formed to cover the opening unit of the can 200 and includes an electrode terminal hole through which the body of the electrode terminal 310 with the insulating gasket 360 passes.

The cap plate 350 includes an electrolyte injection hole formed at one side end thereof. The cap plate 350 may include a vent formed to prevent explosion when internal pressure rises by over-load of the electrode assembly 100.

The insulating gasket 360 includes a hole in the middle thereof for covering the electrode terminal 310, and a top broadly formed, unlike the body inserted into the cap plate 350.

The protective circuit unit 400 is positioned at one side of the cap assembly 300 and examines the state of the battery, such as over-charge, over-discharge and over-current. If abnormal operation occurs, the protective circuit unit 400, which includes a circuit for shutting off charging/discharging, shuts off charging or discharging operation, and therefore it provides the safety and reliability of the secondary battery.

The protective circuit unit 400 comprises a protective circuit board 410 including a circuit controlling all operation of the secondary battery, an positive electrode lead plate 420 and a negative electrode lead plate 430 for connecting the cap assembly 300 to the protective circuit board 410, and a positive terminal 440 and a negative terminal 450 formed to protrude from the protective circuit board 410.

The protective circuit board 410 is formed by mounting a number of electrical devices on a printed circuit board on which a wiring pattern. The positive terminal 440 and the negative terminal 450 are formed at one side of the protective circuit board 410 so as to be connected to the positive electrode lead plate 420 and the negative electrode lead plate 430, to be electrically connected to the cap assembly 300.

Further, external connection terminals 460 and 470 for external connection are formed at the other side opposite to the side on which a number of the electrical devices, the positive terminal and the negative terminal are mounted. In the present embodiment, two external connection terminals are illustrated. However, the number of the external connection terminals may vary (for example two to three) by a person skilled in the art. The external connection terminals may perform the functions of a power terminal forming the electrical path to the outside of the battery, a ground terminal, and an input/output terminal for information of the battery.

When the external connection terminals are mounted, these may not be formed at fixed positions of the protective circuit board. The external connection terminals may be positioned at any positions that enable to perform the function by being connected to the terminals of the devices using the battery.

Further, the protective circuit board includes grooves 415 formed to receive the external connection terminals to be mounted. Thus, each terminal is formed inside the groove. Preferably, the number of the grooves may be the same as that of the external connection terminals to be mounted.

The groove may be formed when the protective circuit board is molded or manufactured. When a wire is soldering, preferably, the depth of the groove may be formed to be equal to or deeper than the thickness generated by the wire or solder, so that the thickness does not increase by the wire or solder.

The interval between the grooves may vary depending on the positions where the terminals are included. Since a short between the terminals can be prevented, compared to the case where a conventional terminal is formed to be higher than the protective circuit board, the interval the terminals may be determined within a broader range than the interval of the conventional terminals.

Further, the groove may be formed in a round shape, a polygonal shape or any shape that is capable of including the external connection terminal. However, preferably, the groove may be formed in a structure making it easy to work when soldering the wire.

Accordingly, an increase in the thickness generated by the wiring soldering is prevented. Upon work, a positional reference point is generated, thereby preventing the movement between the terminal and the wire and to improve the easiness. The soldering is performed within the groove, thereby preventing a short between the terminals.

One side of the positive electrode lead plate 420 is connected to the cap plate 350 and the other side thereof is connected to the positive terminal 440, and one side of the negative electrode lead plate 430 is connected to the electrode terminal 310 and the other side thereof is connected to the negative terminal 450, so that the cap assembly 300 is electrically connected to the protective circuit unit 400. Then, an insulator is formed between the negative electrode lead plate 430 and the cap plate 350, to insulate the negative electrode lead plate 430 from the cap plate 350.

A secondary protection element may be formed between the negative electrode lead plate 430 and the protective circuit board 410. The secondary protection element may use a positive temperature coefficient (PTC) device, a bimetal or thermal fuse. When the PTC device is used, it needs to prevent a short between the PTC device and the cap plate 350.

The molding unit 500 includes all of the positive electrode lead plate 420, the negative electrode lead plate 430, the positive terminal 440 and the negative terminal 450 of the protective circuit unit 400, and is formed by molding a part of the top of the cap plate 350, in which the electrode terminal 310 of the cap assembly 310 is formed, using resin.

Then, the resin should not be molded in the groove 415 formed on the top of the protective circuit board 410.

Figure 5:
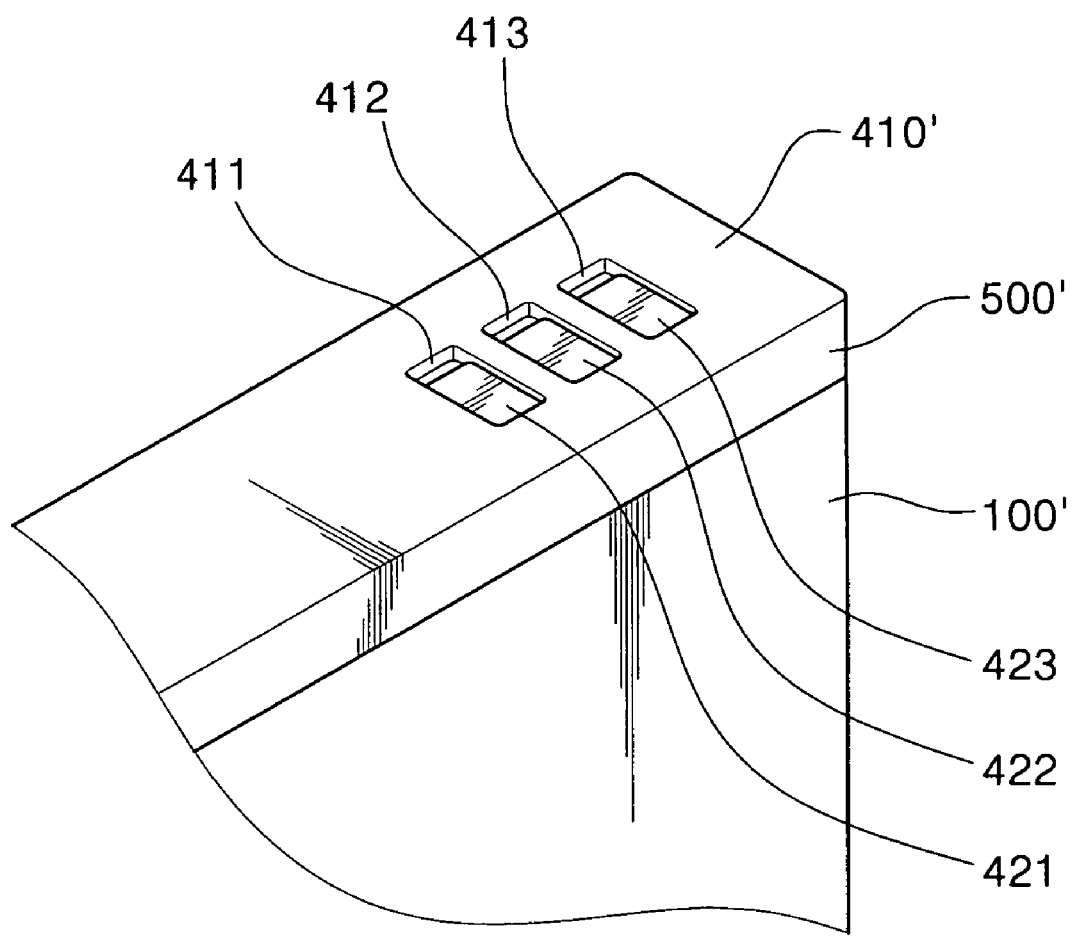
FIG. 5 is a perspective view of a part of the battery pack according to another embodiment of the present invention.
Figure 6A:
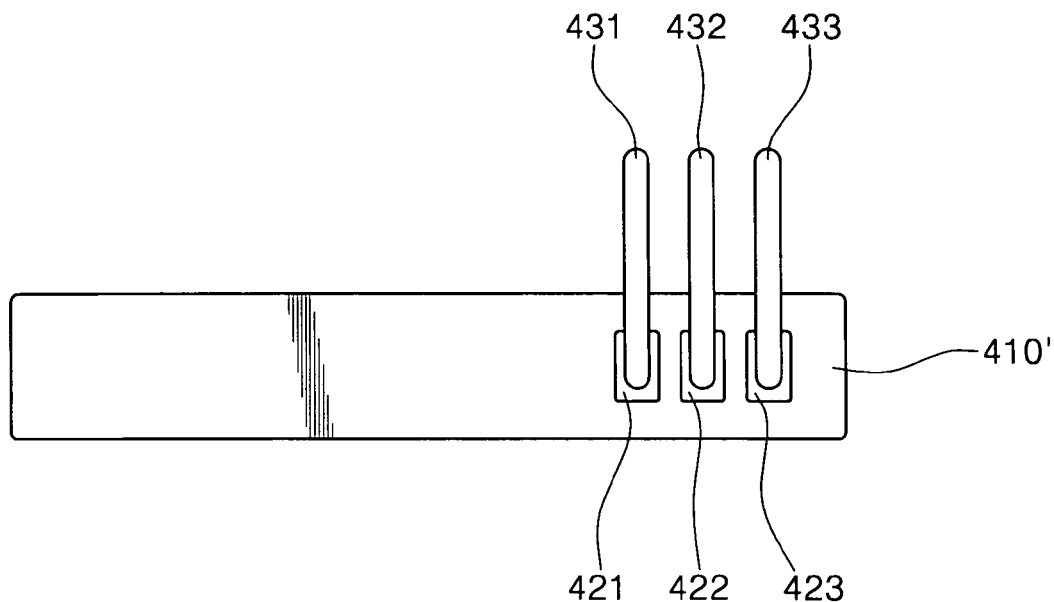
FIGS. 6A and 6B are a plan view and a sectional view of wire soldering performed on a protective circuit board of FIG. 5.
Figure 6B:
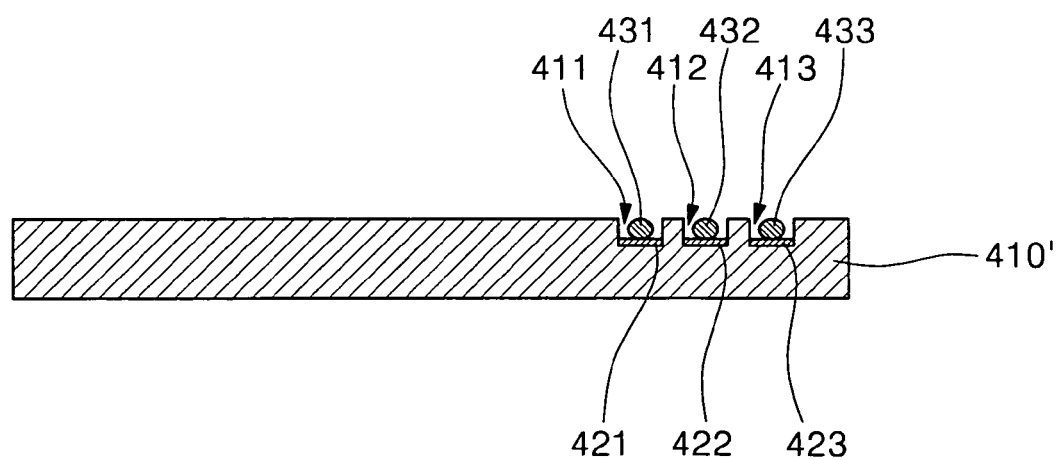

FIG. 5 is a perspective view of a part of the battery pack according to another embodiment of the present invention, in which three external connection terminals and three grooves are formed, and FIGS. 6A and 6B are a plan view and a sectional view of the wire soldering performed on a protective circuit board of FIG. 5.

Referring to FIGS. 5, 6A and 6B, a can 100' and a protective circuit board 410' are connected and joined to each other by a molding unit 500'. A plurality of grooves 411, 412 and 413 are formed on the top of the protective circuit board 410', and external connection terminals 421, 422 and 423 are formed inside the plurality of grooves 411, 412 and 413, respectively.

When a wire is connected to each of the external connection terminals 421, 422 and 423, preferably, wires 431, 432 and 433 may be soldered to be completely disposed inside the grooves 411, 412 and 413 including the terminals 421, 422 and 423, so as not to protrude beyond the protective circuit board 410'. Accordingly, an increase in the thickness generated by the wire soldering is prevented.

The invention has been described using preferred embodiments. However, it is to be understood that the scope of the invention is not limited to the disclosed embodiments. On the contrary, the scope of the invention is intended to include various modifications and alternative arrangements within the capabilities of persons skilled in the art using presently known or future technologies and equivalents. The scope of the claims, therefore, should be accorded the broadest interpretation so as to encompass all such modifications and similar arrangements.

What is claimed is:

1. A protective circuit board for a battery, comprising:
a groove formed on a first surface of the protective circuit board, the groove having a bottom surface recessed inwardly from the first surface and a side wall seamlessly connecting the bottom surface of the groove to the first surface of the protective circuit board; and
an external connection terminal formed on the bottom surface of the groove, the external connection terminal not protruding out of the first surface.

2. The protective circuit board according to claim 1, wherein the protective circuit board including at least two grooves and at least two external connection terminals, and the number of the grooves is the same as the number of the external connection terminals.

3. The protective circuit board according to claim 1, wherein the groove is formed to be equal to or deeper than the thickness generated by a wire and a solder.

4. The protective circuit board according to claim 1, wherein the groove is formed when the protective circuit board is molded or manufactured.

5. The protective circuit board according to claim 1, wherein the groove is formed in a round shape or a polygonal shape.

6. The protective circuit board according to claim 1, further comprising:
a positive terminal coupled to a positive electrode tab of the battery; and
a negative terminal coupled to a negative electrode tab of the battery, both of the positive terminal and the negative terminal formed on a second surface of the protective circuit board that is opposite to the first surface.

7. The protective circuit board according to claim 1, wherein the external connection terminal is a power terminal, a ground terminal, or an input/output terminal.

8. A battery pack comprising:
an electrode assembly including a positive electrode plate, a negative electrode plate and a separator for generating electricity;
a can receiving the electrode assembly and having an opening at one end;
a cap assembly coupled to the electrode assembly, the cap assembly including:
a cap plate covering the opening; and
an electrode terminal coupled to the positive electrode plate or the negative electrode plate; and
a protective circuit unit positioned at one side of the cap assembly, and including a protective circuit board that comprises:
a groove formed on a first surface of the protective circuit board, the groove having a bottom surface recessed inwardly from the first surface and a side wall seamlessly connecting the bottom surface of the groove to the first surface of the protective circuit board; and
an external connection terminal formed on the bottom surface of the groove, the external connection terminal not protruding out of the first surface.

9. The battery pack according to claim 8, wherein the protective circuit board including at least two grooves and at least two external connection terminals, the number of the grooves is the same as the number of the external connection terminals.

10. The battery pack according to claim 8, wherein the groove is formed to be equal to or deeper than the thickness generated by a wire and a solder.

11. The battery pack according to claim 8, wherein the groove is formed when the protective circuit board is molded or manufactured.

12. The battery pack according to claim 8, wherein the groove is formed in a round shape or a polygonal shape.

13. The battery pack according to claim 8, wherein the external connection terminal is a power terminal, a ground terminal, or an input/output terminal.

14. The battery pack according to claim 8, wherein the protective circuit board further comprises:
a positive terminal coupled to the positive electrode plate; and
a negative terminal coupled to the negative electrode plate, both of the positive terminal and the negative terminal formed on a second surface of the protective circuit board that is opposite to the first surface.

15. The battery pack according to claim 8, wherein the cap assembly further comprises:

an insulating case disposed between the cap plate and the electrode assembly;

a terminal plate disposed between the cap plate and the insulating case, the terminal plate being coupled to the electrode terminal;

an insulating plate disposed between the cap plate and the terminal plate, the insulating plate insulating the terminal plate from the cap plate; and an insulating gasket installed inside a hole formed on the cap plate, the electrode terminal engaging into the insulating gasket.

* * * * *